US007525822B2

(12) United States Patent
Aso et al.

(10) Patent No.: US 7,525,822 B2
(45) Date of Patent: *Apr. 28, 2009

(54) DC CONVERTER INCLUDING A TERTIARY WINDING FOR DRIVING SYNCHRONOUS RECTIFIERS

(75) Inventors: Shinji Aso, Niiza (JP); Mamoru Tsuruya, Niiza (JP); Makoto Sato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 138 days.

This patent is subject to a terminal disclaimer.

(21) Appl. No.: 11/357,161

(22) Filed: Feb. 21, 2006

(65) Prior Publication Data

US 2006/0209571 A1 Sep. 21, 2006

(30) Foreign Application Priority Data

Feb. 25, 2005 (JP) ............................ 2005-051710

(51) Int. Cl.
*H02M 3/335* (2006.01)

(52) U.S. Cl. .................................... 363/21.06; 363/127

(58) Field of Classification Search ............. 363/21.06, 363/21.08, 21.09, 127, 56.12, 21.01, 21.14, 363/56.11, 16, 17, 21.04

See application file for complete search history.

(56) References Cited

U.S. PATENT DOCUMENTS 5,991,171 A * 11/1999 Cheng ..................... 363/21.03
6,366,476 B1 * 4/2002 Yasumura ................ 363/21.02
6,466,462 B2 * 10/2002 Nishiyama et al. ....... 363/21.11
6,674,658 B2 * 1/2004 Mao et al. ................... 363/127
6,714,428 B2 * 3/2004 Huang et al. .................. 363/89
7,203,041 B2 * 4/2007 Williams et al. .............. 361/20

FOREIGN PATENT DOCUMENTS

JP 3159261 2/2001

OTHER PUBLICATIONS

U.S. Appl. No. 11/302,184, filed Dec. 14, 2005, Tsuruya et al.
U.S. Appl. No. 11/320,640, filed Dec. 30, 2005, Aso et al.
U.S. Appl. No. 11/355,166, filed Feb. 16, 2006, Aso et al.
U.S. Appl. No. 11/357,161, filed Feb. 21, 2006, Aso et al.
U.S. appl. No. 11/369,871, filed Mar. 8, 2006, Aso et al.

* cited by examiner

*Primary Examiner*—Akm E Ullah
*Assistant Examiner*—Harry Behm
(74) *Attorney, Agent, or Firm*—Oblon, Spivak, McClelland, Maier & Neustadt, P.C.

(57) ABSTRACT

A DC converter has a transformer with loosely coupled primary and secondary windings, a main switch connected in series with the primary winding of the transformer, and a series circuit connected to ends of one of the primary winding and main switch. The series circuit includes a clamp capacitor and an auxiliary switch. The main and auxiliary switches are alternately turned on/off so that a voltage of the secondary winding of the transformer is synchronously rectified with synchronous rectifiers and is smoothed with smoothing elements, to provide a DC output. The DC converter also includes a tertiary winding provided for the transformer, tightly coupled with the primary winding, and configured to generate a voltage that drives the synchronous rectifiers.

8 Claims, 12 Drawing Sheets

DC CONVERTER INCLUDING A TERTIARY WINDING FOR DRIVING SYNCHRONOUS RECTIFIERS

BACKGROUND OF THE INVENTION

1. Field of the Invention

The present invention relates to a highly efficient DC (direct current) converter.

2. Description of the Related Art

FIG. 1 is a circuit diagram showing a DC converter according to a related art. The DC converter shown in FIG. 1 is a forward converter provided with active clamps. The DC converter includes a DC power source Vin and a main switch Q1 such as a MOSFET (field effect transistor) connected to the DC power source Vin through a primary winding P1 (having the number of turns of n1) of a transformer Ta.

Ends of the primary winding P1 are connected to a series circuit that consists of an auxiliary switch Q2 such as a MOSFET and a clamp capacitor C2. The series circuit consisting of the switch Q2 and clamp capacitor C2 forms an active clamp circuit, which may be connected in parallel with the switch Q1.

A diode D1 is connected between the drain and source of the switch Q1, and a diode D2 is connected between the drain and source of the switch Q2. The diodes D1 and D2 may be parasitic diodes of the switches Q1 and Q2 if the switches Q1 and Q2 are MOSFETs containing the parasitic diodes. A capacitor C3 is a voltage resonance capacitor and is connected between the drain and source of the switch Q1. The capacitor C3 may be a parasitic capacitance of the switch Q1.

The switches Q1 and Q2 have a dead time during which they are both turned off by a control circuit 11. The control circuit 11 conducts PWM control to alternately turn on/off the switches Q1 and Q2.

The primary winding P1 and a secondary winding S1 (having the number of turns of n2) of the transformer Ta are wound to generate in-phase voltages. In FIG. 1, a filled circle represents a winding start of each of the primary winding P1 and secondary winding S1 of the transformer Ta.

A leakage inductance LS is produced between the primary winding P1 and the secondary winding S1 of the transformer Ta. Through the leakage inductance LS, a first end of the secondary winding S1 is connected to the cathode of a diode D10. A second end (indicated with the filled circle) of the secondary winding S1 is connected to the cathode of a diode D11. The anode of the diode D11 is connected to the anode of the diode D10.

The ends of the diode D10 are connected to the drain and source of a switch Q10, which may be a MOSFET serving as a synchronous rectifier for rectification. The ends of the diode D11 are connected to the drain and source of a switch Q11, which may be a MOSFET serving as a synchronous rectifier for current circulation. The gate of the switch Q10 is connected to the second end (indicated with the filled circle) of the secondary winding S1. The gate of the switch Q11 is connected through the leakage inductance LS to the first end of the secondary winding S1.

The diodes D10 and D11 may be parasitic diodes of the switches Q10 and Q11 if the switches Q10 and Q11 are MOSFETs containing the parasitic diodes. The elements D10, D11, Q10, and Q11 form a synchronous rectifying circuit. The synchronous rectifying circuit rectifies voltage (on/off-controlled pulse voltage), which is generated by the secondary winding S1 of the transformer Ta in synchronization with on/off operation of the switch Q1, and outputs the rectified voltage.

The ends of the diode D10 are connected to a series circuit including a resistor R20 and a capacitor C20. The ends of the diodes D11 are connected to a series circuit including a resistor R21 and a capacitor C21. These two series circuits are CR snubber circuits to attenuate surge voltage during recovery of the diodes D10 and D11.

The ends of the switch Q11 are connected in series with a smoothing reactor L1 (corresponding to a smoothing element) and a smoothing capacitor C10 (corresponding to a smoothing element), to form a smoothing circuit. The smoothing circuit smoothes the rectified output of the synchronous rectifying circuit and provides a DC output to a load 50.

Based on an output voltage of the load 50, the control circuit 11 generates a pulse control signal to turn on/off the switches Q1 and Q2, and at the same time, controls the duty factor of the control signal so as to bring the output voltage to a predetermined value.

The DC converter also includes a low-side driver 13 and a high-side driver 15. The low-side driver 13 applies a gate signal Q1*g* from the control circuit 11 to the gate of the switch Q1, to thereby drive the switch Q1. The high-side driver 15 applies a gate signal Q2*g* from the control circuit 11 to the gate of the switch Q2, to thereby drive the switch Q2.

Operation of the DC converter of the above-mentioned configuration will be explained with reference to a timing chart of FIG. 2. In FIG. 2, Q1*g* is a gate signal to the switch Q1, Q2*g* a gate signal to the switch Q2, Q1*v* a drain-source voltage of the switch Q1, Q1*i* a drain current of the switch Q1, Q2*i* a drain current of the switch Q2, C3*i* a current to the capacitor C3, Q10*v* a drain-source voltage of the switch Q10, D10*i* a current to the diode D10, Q10*i* a drain current of the switch Q10, Q11*v* a drain-source voltage of the switch Q11, D11*i* a current to the diode D11, and Q11*i* a drain current of the switch Q11.

Before t0, the switch Q1 is OFF and the switch Q2 ON. On the primary side of the transformer Ta, a current passes through a path along Q2, P1, C2, and Q2. The primary winding P1 of the transformer Ta receives a voltage VC2 from the clamp capacitor C2, and the potential of the winding end of the primary winding P1 is positive. Accordingly, a terminal voltage of the secondary winding S1 is expressed by VC2·(n2/n1) and the potential of the winding end of the secondary winding S1 is positive.

As a result, the voltage Q10*v* of the switch Q10 is equal to VC2·(n2/n1) and the gate voltage of the switch Q11 is expressed by VC2·(n2/n1) and is positive. This turns on the switch Q11. On the secondary side of the transformer Ta, a current passes through a route of L1, C10, Q11, and L1. The voltage Q11*v* is substantially zero and the switch Q10 is OFF.

At t0 of period T1, the switch Q2 changes from ON to OFF and the current passing through the path along Q2, P1, C2, and Q2 becomes zero. Instead, a current passes through a path along P1, Vin, C3, and P1, to discharge the capacitor C3 and drop the voltage Q1*v* of the switch Q1. When the voltage Q1*v* drops, the terminal voltage of the primary winding P1 decreases to decrease the terminal voltage of the secondary winding S1. This results in decreasing the voltage Q10*v* of the switch Q10.

At t1 of period T2, the voltage Q10*v* of the switch Q10 decreases to a gate threshold voltage Vth11 of the switch Q11, to turn off the switch Q11. The current Q11*i* of the switch Q11 becomes zero, and the current to the switch Q11 starts to pass through the diode D11.

At t2 of period T3, the voltage Q1*v* of the switch Q1 reaches the voltage of the DC power source Vin. The terminal voltage of the primary winding P1 becomes zero, and therefore, the terminal voltage of the secondary winding S1 becomes zero. This drops the voltage Q10*v* of the switch Q10 to zero. The voltage Q1*v* of the switch Q1 further decreases to apply positive potential to the winding start of the primary winding P1, and therefore, positive potential is applied to the winding start of the secondary winding S1. At t3, the voltage Q1*v* of the switch Q1 becomes zero. Then, the terminal voltage of the primary winding P1 becomes Vin and the terminal voltage of the secondary winding S1 becomes Vin·(n2/n1). In the period T3, the terminal voltage of the primary winding P1 changes from zero to Vin with the winding start of the primary winding P1 being positive. At this time, the terminal voltage of the secondary winding S1 changes from zero to Vin·(n2/n1) with the winding start of the secondary winding S1 being positive.

Accordingly, a current ILS(t) passing through the leakage inductance LS increases according to following expression:

$$ILS(t)=(VS1(t)/LS)\cdot t \quad (1),$$

where VS1(t) is a terminal voltage of the secondary winding S1, LS is a leakage inductance value, and t is time. The current passing through the leakage inductance LS is equal to the current of the diode D10, and therefore, the current D10*i* of the diode D10 increases in the period T3. By an increment of the current D10*i* of the diode D10, the current D11*i* of the diode D11 decreases. During the period T3 on the secondary side of the transformer Ta, a current passes through a route of L1, C10, D11, and L1 and another current passes through a route of L1, C10, D10, LS, S1, and L1. The latter current increases according to the expression (1), and the former current decreases thereby.

At t3 of period T4, the capacitor C3 completely discharges, the voltage Q1*v* of the switch Q1 becomes zero, the current passing through the path along P1, Vin, C3, and P1 changes its direction to a path along P1, Vin, D1 (Q1), and P1, and the switch Q1 turns on in response to the gate signal Q1*g*.

In the period T4, the voltage Q1*v* of the switch Q1 is substantially zero and the terminal voltage of the primary winding P1 is Vin. The terminal voltage VS1(t) of the secondary winding S1, therefore, is expressed as Vin·(n2/n1). The current ILS(t) passing through the leakage inductance LS increases according to following expression:

$$\begin{aligned} ILS(t) &= (VS1(t))/LS)\cdot t + ILS(t3) \\ &= (Vin\cdot(n2/n1)/LS)\cdot t + ILS(t3), \end{aligned} \quad (2)$$

where ILS(t3) is a current passing through the leakage inductance LS at t3. By an increment of the current passing through the leakage inductance LS, the current D11*i* of the diode D11 decreases and reaches at t4 a current passing through the smoothing reactor L1. Then, the current ILS(t) becomes equal to the current of the smoothing reactor L1, the current D11*i* of the diode D11 becomes zero, and the diode D11 passes a reverse current due to a recovery current of the diode D11. The current Q1*i* of the switch Q1 is proportional to a current passing through the secondary winding S1 at the ratio of the numbers of turns. The current Q1*i* of the switch Q1, therefore, increases and reaches at t4 a value of n2/n1 (the ratio of the numbers of turns) times a current passing through the smoothing reactor L1.

At t4 of period T5, the recovery current of the diode D11 decreases, and the voltage Q11*v* of the switch Q11 increases. When the voltage Q11*v* of the switch Q11 reaches a gate threshold voltage Vth10 of the switch Q10, the switch Q10 turns on so that a current passing through the diode D10 changes its direction to the switch Q10. The voltage Q11*v* of the switch Q11 oscillates due to the joint capacitance of the leakage inductance LS and diode D11 and the output capacitance of the switch Q11. The oscillation gradually attenuates, and the voltage Q11*v* of the switch Q11 settles to be Vin·(n2/n1).

If the voltage Q11*v* of the switch Q11 oscillates to cross the gate threshold voltage Vth10 of the switch Q10, the switch Q10 repeatedly turns on and off to cause chattering as shown in an operational waveform of FIG. 6 involving large ringing. To suppress such oscillation, the CR snubber circuit consisting of the resistor R21 and capacitor C21 may be added. Since the primary winding P1 and secondary winding S1 are loosely coupled to increase the leakage inductance LS, the amplitude of the oscillation is large and the frequency thereof is low. This results in increasing a loss of the CR snubber circuit and deteriorating efficacy.

At t5 of period T6, the gate signal Q1*g* of the switch Q1 falls to zero, thereby zeroing the current Q1*i* of the switch Q1. The current passing through the route of Vin, P1, Q1, and Vin starts to change to a route of Vin, P1, C3, and Vin, to increase the voltage of the capacitor C3. As a result, the voltage Q1*v* of the switch Q1 increases and the voltage Q11*v* of the switch Q11 decreases.

At t6 of period T7, the voltage Q11*v* of the switch Q11 decreases to the gate threshold voltage Vth10 of the switch Q10. The switch Q10 turns off to zero the current Q10*i* of the switch Q10, and the current passing through the switch Q10 changes its direction to the diode D10.

At t7 of period T8, the voltage Q1*v* of the switch Q1 reaches Vin. The terminal voltage of the primary winding P1 becomes zero and the terminal voltage of the secondary winding S1 also becomes zero to zero the voltage Q11*v* of the switch Q11. The voltage Q1*v* of the switch Q1 further increases to apply positive potential to the winding end of the primary winding P1. The winding end of the secondary winding S1 also receives positive potential. At t8, the voltage Q1*v* of the switch Q1 reaches level of Vin+VC2. As a result, the terminal voltage of the primary winding P1 becomes VC2 and that of the secondary winding S1 becomes VC2·(n2/n1). In the period T8, the terminal voltage of the primary winding P1 with its winding end receiving positive potential changes from zero to VC2. At this time, the terminal potential of the secondary winding S1 with its winding end receiving positive potential changes from zero to a level of VC2·(n2/n1). Accordingly, the current ILS(t) passing through the leakage inductance LS decreases according to following expression:

$$ILS(t)=ILS(t7)-(VS1(t)/LS)\cdot t \quad (3),$$

where VS1(t) is the terminal voltage of the secondary winding S1 and ILS(t7) is a current passing through the leakage inductance LS at t7. The current passing through the leakage inductance LS is equal to the current passing through the diode D10, and therefore, the current D10*i* of the diode D10 decreases in the period T8. By a decrement in the current D10*i* of the diode D10, the current D11*i* of the diode D11 increases.

In the period T8 on the secondary side of the transformer Ta, a current passes through the route of L1, C10, D10, LS, S1, and L1 and another current passes through the route of L1, C10, D11, and L1. The former current decreases according to the expression (3), and the latter current increases by the decrement of the former current.

At t8 of period T9, the capacitor C3 is completely charged, the voltage Q1*v* of the switch Q1 is substantially a level of Vin+VC2, and the terminal voltage of the primary winding P1 is VC2. Accordingly, the terminal voltage VS1(t) of the secondary winding S1 is a level of VC2·(n2/n1) and the current ILS(t) passing through the leakage inductance LS decreases according to following expression:

$$ILS(t) = ILS(t8) - (VS1(t)/LS)\cdot t \tag{4}$$
$$= ILS(t8) - (VC2\cdot(n2/n1)/LS)\cdot t,$$

where ILS(t8) is a current passing through the leakage inductance LS at t8. In this way, the current passing through the leakage inductance LS decreases, and by this decrement, the current D11*i* of the diode D11 increases. At t9, the current D10*i* of the diode D10 becomes zero, and the diode D10 passes a reverse current due to a recovery current. The current D11*i* of the diode D11 becomes equal to a current passing through the smoothing reactor L1. The current Q2*i* of the switch Q2 is proportional to a current passing through the secondary winding S1 at the ratio of the numbers of turns. Namely, the current Q2*i* of the switch Q2 increases and becomes an excitation current of the primary winding P1 at t9.

At t9 of period T10, the recovery current of the diode D10 decreases and the voltage Q10*v* of the switch Q10 increases. The voltage Q10*v* reaches the gate threshold voltage Vth11 of the switch Q11 to turn on the switch Q11. Then, a current passing to the diode D11 changes its direction to the switch Q11.

The voltage Q10*v* of the switch Q10 oscillates due to the joint capacitance of the leakage inductance LS and diode D10 and the output capacitance of the switch Q10. The oscillation of the voltage Q10*v* gradually attenuates and reaches a level of VC2·(n2/n1).

If the voltage Q10*v* of the switch Q10 oscillates to cross the gate threshold voltage Vth11 of the switch Q11, the switch Q11 repeatedly turns on and off to cause chattering as shown in an operational waveform of FIG. 6 involving large ringing. To suppress such oscillation, the CR snubber circuit consisting of the resistor R20 and capacitor C20 may be added. Since the primary winding P1 and secondary winding S1 are loosely coupled to increase the leakage inductance LS, the amplitude of the oscillation is large and the frequency thereof is low. This results in increasing a loss of the CR snubber circuit and deteriorating efficacy.

In this way, driving the synchronous rectifiers by the secondary winding S1 according to the related art passes a current to the diode D10 in the periods T3, T4, T7, T8, and T9 and a current to the diode D11 in the periods T2, T3, T4, T8, and T9. Namely, during these periods, no current passes through the synchronous rectifiers (switches Q10 and Q11). Instead, the currents pass through the diodes D10 and D11 during the periods, thereby deteriorating the efficiency of synchronous rectification and the efficiency of a power source. In addition, the diodes D10 and D11 connected in parallel with the synchronous rectifiers produce recovery currents that repeatedly turn on/off the synchronous rectifiers. This results in causing the chattering of the synchronous rectifiers and deteriorating efficiency. Adding the CR snubber circuits to suppress the chattering will increase losses and deteriorate efficiency.

FIG. 3 is a circuit diagram showing a DC converter according to a second related art. In FIG. 3, the primary side of a transformer Tb employs an active clamp circuit and is the same as the primary side of the transformer Ta of FIG. 1, and therefore, the explanation thereof is omitted. The transformer Tb has a primary winding (having the number of turns of n1), a first secondary winding S1 (having the number of turns of n2) very loosely coupled with the primary winding P1, and a second secondary winding S2 (having the number of turns of n3) loosely coupled with the primary winding P1. A first end of the first secondary winding S1 is connected to a first end of the second secondary winding S2. The ends of the first secondary winding S1 are connected through a leakage inductance L1 to a saturable reactor LH. The saturable reactor LH is formed with the use of the saturation characteristic of a core of the transformer Tb.

A second end (indicated with a filled circle) of the second secondary winding S2 is connected through a leakage inductance LS to the cathode of a diode D11. The first end of the second secondary winding S2 is connected to the cathode of a diode D10. The anode of the diode D10 is connected to the anode of the diode D11.

The ends of the diode D10 are connected to the drain and source of a switch Q10 such as a MOSFET. The ends of the diode D11 are connected to the drain and source of a switch Q11 such as a MOSFET. The gate of the switch Q11 is connected to the first end of the second secondary winding S2. The gate of the switch Q10 is connected through the leakage inductance LS to the second end of the second secondary winding S2. The second end of the first secondary winding S1 is connected through the leakage inductance L1 to a first end of a capacitor C10. A second end of the capacitor C10 is connected to a node between the anode of the diode D10 and the anode of the diode D11.

The leakage inductance LS exists between the loosely coupled primary winding P1 and second secondary winding S2. The leakage inductance L1 between the very loosely coupled primary winding P1 and first secondary winding S1 serves as a smoothing reactor of the forward converter and accumulates energy when a switch Q1 is ON. When the switch Q1 is OFF, the second secondary winding S2 returns the energy accumulated in the leakage inductance L1 to the secondary side of the transformer Tb.

The leakage inductance LS stores energy accumulated when the switch Q1 is ON into a clamp capacitor C2, to drop a core around which the first secondary winding S1 is wound to the third quadrant and saturate the same.

FIG. 4 is a view showing the structure of the transformer Tb of the DC converter according to the second related art. FIG. 5 is an equivalent circuit diagram showing the transformer of FIG. 4. In FIG. 4, the transformer Tb has a core 30 having a rectangular external shape. The core 30 has spaces 35*a* and 35*b* extending in parallel to each other in a longitudinal magnetic path direction, to form magnetic paths 32*a*, 32*b*, and 32*c*. Around a core part 30*a* of the core 30, the primary winding P1 and second secondary winding S2 are wound adjacent to each other. This produces the slight leakage inductance LS between the primary winding P1 and the second secondary winding S2. The core 30 has a path core 30*c* and a gap 31. Around a peripheral core, the first secondary winding S1 is wound. The path core 30*c* works to very loosely couple the primary winding P1 and first secondary winding S1 with each other, thereby increasing the leakage inductance L1.

On the peripheral core and between the primary winding P1 and the second secondary winding S2, a recess 30*b* is formed. The recess 30*b* reduces the sectional area of a part of a magnetic path of the core so that only the part may saturate. This configuration can reduce a core loss. The part that saturates is used as the saturable reactor LH. Forming the recess 30*b* at a part of the core 30 where the first secondary winding S1 is wound results in saturating the part, increasing an excitation current, and producing a voltage resonance. Black dots shown in FIG. 5 indicate the winding starts of the primary winding P1, first secondary winding S1, and second secondary winding S2 of the transformer Tb.

Operation of the DC converter of FIG. 3 will be explained with reference to a timing chart of FIG. 7.

Before t0, the switch Q1 is OFF and the switch Q2 ON. On the primary side of the transformer Tb, a current passes through a route of Q2, P1, C2, and Q2. On the secondary side of the transformer Tb, a current passes through a route of L1, C10, Q11, LS, S2, S1, and L1. A voltage Q11*v* of the switch Q11 is substantially zero. The switch Q10 is OFF. The primary winding P1 of the transformer Tb receives a voltage VC2 from the clamp capacitor C2, and the potential of the winding end of the primary winding P1 is positive. Accordingly, a terminal voltage of the second secondary winding S2 is a level of VC2·(n3/n1) and the potential of the winding end of the second secondary winding S2 is positive.

The voltage of the first secondary winding S1 (including the leakage inductance L1) is a level of VC2·(n3/n1)−Vout and the potential of the winding end of the first secondary winding S1 is positive. The voltage Q10*v* of the switch Q10, therefore, is positive and is equal to a level of VC2·(n3/n1). Namely, the gate voltage of the switch Q11 is positive, and therefore, the switch Q11 is ON.

At t0 of period T1, the switch Q2 changes from ON to OFF and a current passing through the path along Q2, P1, C2, and Q2 becomes zero. Instead, a current passes through a path along P1, Vin, C3, and P1, to discharge a capacitor C3 and drop the voltage Q1*v* of the switch Q1. When the voltage Q1*v* drops, the terminal voltage of the primary winding P1 decreases to decrease the terminal voltage of the second secondary winding S2. This results in decreasing the voltage Q10*v* of the switch Q10.

At t1 of period T2, the voltage Q10*v* of the switch Q10 decreases to a gate threshold voltage Vth11 of the switch Q11, to turn off the switch Q11. A current Q11*i* of the switch Q11 becomes zero, and the current to the switch Q11 starts to pass through the diode D11.

At t2 of period T3, the voltage Q1*v* of the switch Q1 reaches Vin. The terminal voltage of the primary winding P1 becomes zero, and therefore, the terminal voltage of the second secondary winding S2 becomes zero. This drops the voltage Q10*v* of the switch Q10 to zero. The voltage Q1*v* of the switch Q1 further decreases to apply positive potential to the winding start of the primary winding P1, and therefore, positive potential is applied to the winding start of the second secondary winding S2. At t3, the voltage Q1*v* of the switch Q1 becomes zero. Then, the terminal voltage of the primary winding P1 becomes Vin and the terminal voltage of the second secondary winding S2 becomes a value of Vin·(n3/n1). In the period T3, the terminal voltage of the primary winding P1 changes from zero to Vin with the winding start of the primary winding P1 being positive. At this time, the terminal voltage of the second secondary winding S2 changes from zero to a level of Vin·(n3/n1) with the winding start of the second secondary winding S2 being positive.

Accordingly, a current ILS(t) passing through the leakage inductance LS decreases according to following expression:

$$ILS(t)=ILS(t2)-(VS2(t)/LS)\cdot t \qquad (5),$$

where VS2(t) is a terminal voltage of the second secondary winding S2 and ILS(t2) is a current passing through the leakage inductance LS at t2. The current passing through the leakage inductance LS is equal to the current of the diode D11, and therefore, the current D11*i* of the diode D11 decreases in the period T3.

By a decrement of the current D11*i* of the diode D11, the current D10*i* of the diode D10 increases. During the period T3 on the secondary side of the transformer Tb, a current passes through a path along L1, C10, D11, LS, S2, S1, and L1 and another current passes through a path along L1, C10, D10, S1, and L1. The former current decreases according to the expression (5), and the latter current increases thereby.

At t3 of period T4, the capacitor C3 completely discharges, the voltage Q1*v* of the switch Q1 becomes zero, the current passing through the path along P1, Vin, C3, and P1 changes its direction to a path along P1, Vin, D1 (Q1), and P1, and the switch Q1 turns on in response to a gate signal Q1*g*.

In the period T4, the voltage Q1*v* of the switch Q1 is substantially zero and the terminal voltage of the primary winding P1 is Vin. The terminal voltage VS2(t) of the second secondary winding S2, therefore, is a level of Vin·(n3/n1). The current ILS(t) passing through the leakage inductance LS decreases according to following expression:

$$\begin{aligned} ILS(t) &= ILS(t3) - (VS2(t)/LS)\cdot t \qquad (6) \\ &= ILS(t3) - (Vin\cdot(n3/n1)/LS)\cdot t, \end{aligned}$$

where ILS(t3) is a current passing through the leakage inductance LS at t3. By a decrement of the current passing through the leakage inductance LS, the current D10*i* of the diode D10 increases. At t4, the current D10*i* of the diode D10 reaches a current passing through the leakage inductance L1. Then, the current D11*i* of the diode D11 becomes zero and the diode D11 passes a reverse current due to a recovery current of the diode D11.

The current Q1*i* of the switch Q1 is proportional to a current passing through the second secondary winding S2 at the ratio of the numbers of turns. The current Q1*i* of the switch Q1, therefore, increases and reaches at t4 the ratio of the numbers of turns times the current passing through the leakage inductance L1.

At t4 of period T5, the recovery current of the diode D11 decreases, and the voltage Q11*v* of the switch Q11 increases. When the voltage Q11*v* of the switch Q11 reaches a gate threshold voltage Vth10 of the switch Q10, the switch Q10 turns on so that the current passing through the diode D10 changes its direction to the switch Q10. The voltage Q11*v* of the switch Q11 oscillates due to the joint capacitance of the leakage inductance LS and diode D11 and the output capacitance of the switch Q11. The oscillation gradually attenuates, and the voltage Q11*v* of the switch Q11 settles to a level of Vin·(n3/n1).

If the voltage Q11*v* of the switch Q11 oscillates to cross the gate threshold voltage Vth10 of the switch Q10, the switch Q10 repeatedly turns on and off to cause chattering as shown in the operational waveform of FIG. 6 involving large ringing. To suppress such oscillation, a CR snubber circuit consisting of a resistor R21 and a capacitor C21 may be added. Since the primary winding P1 and second secondary winding S2 are loosely coupled to increase the leakage inductance LS, the amplitude of the oscillation is large and the frequency thereof is low. This results in increasing a loss of the CR snubber circuit and deteriorating efficacy.

At t5 of period T6, the gate signal Q1*g* of the switch Q1 falls to zero, to zero the current Q1*i* of the switch Q1. The current passing through the path along Vin, P1, Q1, and Vin starts to change to the route of Vin, P1, C3, and Vin, to increase the voltage of the capacitor C3. As a result, the voltage Q1*v* of the switch Q1 increases and the voltage Q11*v* of the switch Q11 decreases.

At t6 of period T7, the voltage Q11*v* of the switch Q11 decreases to the gate threshold voltage Vth10 of the switch Q10. The switch Q10 turns off to zero the current Q10*i* of the switch Q10, and the current passing through the switch Q10 changes its direction to the diode D10.

At t7 of period T8, the voltage Q1*v* of the switch Q1 reaches Vin. The terminal voltage of the primary winding P1 becomes zero and the terminal voltage of the second secondary winding S2 also becomes zero to zero the voltage Q11*v* of the switch Q11. The voltage Q1*v* of the switch Q1 further increases to apply positive potential to the winding end of the primary winding P1. The winding end of the second secondary winding S2 also receives positive potential. At t8, the voltage Q1*v* of the switch Q1 reaches a level of Vin+VC2. As a result, the terminal voltage of the primary winding P1 becomes VC2 and that of the second secondary winding S2 becomes a level of VC2·(n3/n1).

In the period T8, the terminal voltage of the primary winding P1 with its winding end receiving positive potential changes from zero to VC2. At this time, the terminal potential of the second secondary winding S2 with its winding end receiving positive potential changes from zero to a level of VC2·(n3/n1). Accordingly, the current ILS(t) passing through the leakage inductance LS increases according to following expression:

$$ILS(t)=(VS2(t)/LS)\cdot t \quad (7),$$

where VS2 (t) is the terminal voltage of the second secondary winding S2. The current passing through the leakage inductance LS is equal to the current passing through the diode D11, and therefore, the current D11*i* of the diode D11 increases in the period T8. By an increment in the current D11*i* of the diode D11, the current D10*i* of the diode D10 decreases.

In the period T8 on the secondary side of the transformer Tb, a current passes through the route of L1, C10, D10, S1, and L1 and another current passes through the route of L1, C10, D11, LS, S2, S1, and L1. The latter current increases according to the expression (7), and the former current decreases by the increment of the latter current.

At t8 of period T9, the capacitor C3 is completely charged, the voltage Q1*v* of the switch Q1 is substantially a level of Vin+VC2, and the terminal voltage of the primary winding P1 is VC2. Accordingly, the terminal voltage VS2(t) of the second secondary winding S2 is a level of VC2·(n3/n1) and the current ILS(t) passing through the leakage inductance LS increases according to following expression:

$$\begin{aligned} ILS(t) &= ILS(t8) - (VS2(t)/LS)\cdot t \\ &= ILS(t8) - (VC2\cdot(n3/n1)/LS)\cdot t, \end{aligned} \quad (8)$$

where ILS(t8) is a current passing through the leakage inductance LS at t8. In this way, the current passing through the leakage inductance LS increases, and by this increment, the current D10*i* of the diode D10 decreases. At t9, the current D10*i* of the diode D10 becomes zero, and the diode D10 passes a reverse current due to a recovery current. The current D11*i* of the diode D11 becomes equal to a current passing through the leakage inductance L1. The current Q2*i* of the switch Q2 is proportional to a current passing through the second secondary winding S2 at the ratio of the numbers of turns. Namely, the current Q2*i* of the switch Q2 increases and becomes an excitation current of the primary winding P1 at t9.

At t9 of period T10, the recovery current of the diode D10 decreases and the voltage Q10*v* of the switch Q10 increases. The voltage Q10*v* reaches the gate threshold voltage Vth11 of the switch Q11 to turn on the switch Q11. Then, a current passing through the diode D11 changes its direction to the switch Q11. The voltage Q10*v* of the switch Q10 oscillates due to the joint capacitance of the leakage inductance LS and diode D10 and the output capacitance of the switch Q10. The oscillation of the voltage Q10*v* gradually attenuates and reaches a level of VC2·(n3/n1).

If the voltage Q10*v* of the switch Q10 oscillates to cross the gate threshold voltage Vth11 of the switch Q11, the switch Q11 repeatedly turns on and off to cause chattering as shown in the operational waveform of FIG. 6 involving large ringing. To suppress such oscillation, a CR snubber circuit consisting of a resistor R20 and a capacitor C20 may be added. Since the primary winding P1 and second secondary winding S2 are loosely coupled to increase the leakage inductance LS, the amplitude of the oscillation is large and the frequency thereof is low. This results in increasing a loss of the CR snubber circuit and deteriorating efficacy.

SUMMARY OF THE INVENTION

The DC converter of the second related art of FIG. 3 has problems similar to the DC converter of the first related art of FIG. 1. Namely, driving the synchronous rectifiers by the second secondary winding S2 passes a current to the diode D10 in the periods T3, T4, T7, T8, and T9 and a current to the diode D11 in the periods T2, T3, T4, T8, and T9. Namely, during these periods, no current is passed through the synchronous rectifiers (switches Q10 and Q11). Instead, currents are passed through the diodes D10 and D11 during the periods, thereby deteriorating the efficiency of synchronous rectification and the efficiency of a power source. In addition, the diodes D10 and D11 connected in parallel with the synchronous rectifiers produce recovery currents that repeatedly turn on/off the synchronous rectifiers. This results in causing the chattering of the synchronous rectifiers and deteriorating efficiency. Adding the CR snubber circuits to suppress the chattering will increase losses and deteriorate efficiency.

According to the present invention, DC converter capable of stably driving synchronous rectifiers and improving efficiency can be provided.

According to a technical aspect of the present invention, a DC converter has a transformer with loosely couple primary and secondary windings, a main switch connected in series with the primary winding, and a series circuit connected to ends of one of the primary winding and main switch, the series circuit including a clamp capacitor and an auxiliary switch. The main and auxiliary switches are alternately turned on/off so that a voltage of the secondary winding of the transformer is synchronously rectified with synchronous rectifiers and is smoothed with smoothig elements, to provide a DC output. The DC converter also includes a tertiary winding tightly coupled with the primary winding of the transformer. The tertiary winding generates a voltage to drive the synchronous rectifiers.

DESCRIPTION OF THE PREFERRED EMBODIMENT

DC converters according to embodiments of the present invention will be explained in detail with reference to the drawings.

FIRST EMBODIMENT

Figure 8:
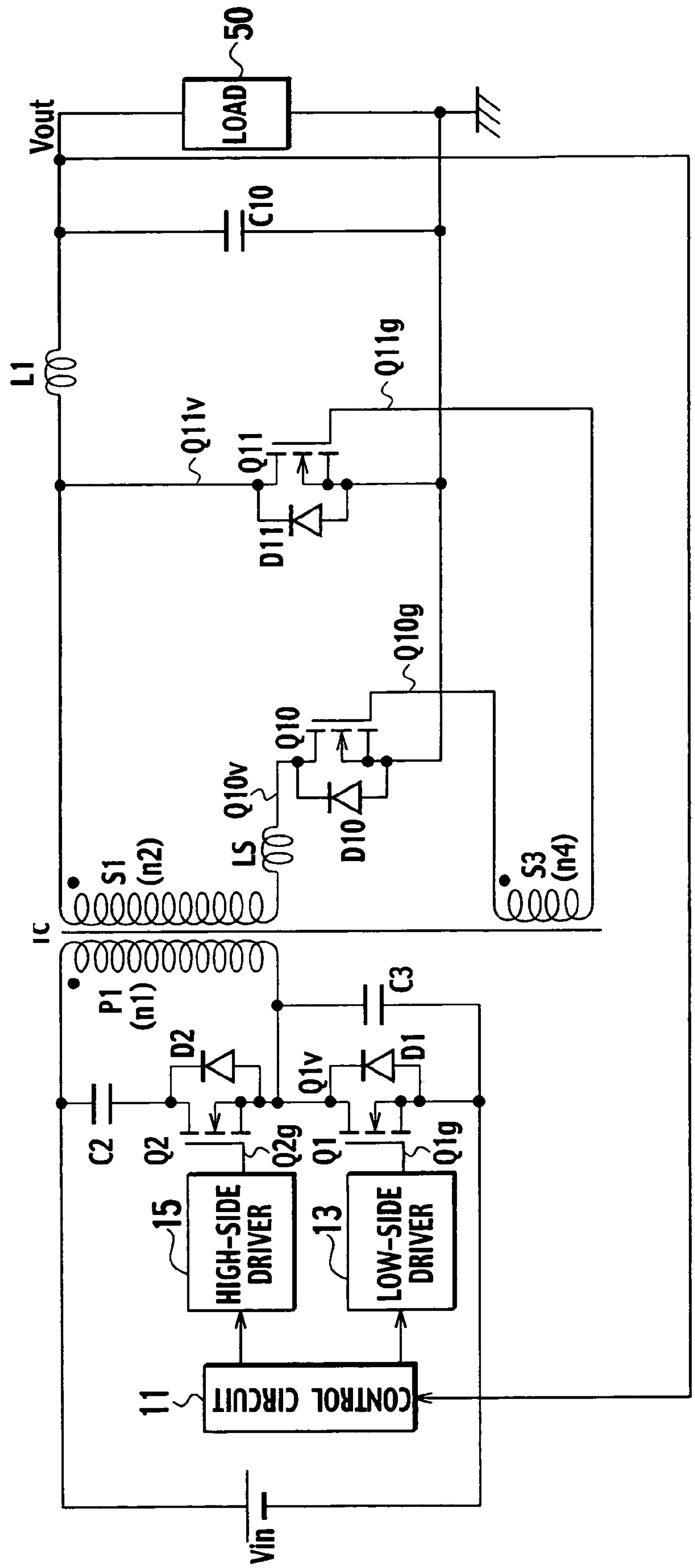
FIG. 8 is a circuit diagram showing a DC converter according to an first embodiment of the present invention.

FIG. 8 is a circuit diagram showing a DC converter according to the first embodiment of the present invention. The first embodiment will be mainly explained in connection with parts that are different from those of the DC converter of FIG. 1.

A transformer Tc has a primary winding P1 (having the number of turns of n1), a secondary winding S1 (having the number of turns of n2) loosely coupled with the primary winding P1, and a tertiary winding S3 (having the number of turns of n4) tightly coupled with the primary winding P1. To turn on a switch Q10 when a switch Q1 is ON, the winding start of the tertiary winding S3 is connected to the gate of the switch Q10. To turn on a switch Q11 when the switch Q1 is OFF, the winding end of the tertiary winding S3 is connected to the gate of the switch Q11.

A voltage generated by the tertiary winding S3 is applied to the gates of the switches Q10 and Q11, to drive the switches Q10 and Q11. The tertiary winding S3 is tightly coupled with the primary winding P1, and therefore, has the same voltage waveform as that of the primary winding P1.

The DC converter according to the first embodiment can extend the ON period of each of the switches Q10 and Q11 serving as synchronous rectifiers and improve the efficiency thereof. The DC converter employs the tertiary winding S3 tightly coupled with the primary winding P1, to drive the synchronous rectifiers. This prevents the synchronous rectifiers from repeatedly turning on and off to cause chattering due to oscillation caused by recovery currents of rectifying diodes D10 and D11 connected in parallel with the synchronous rectifiers. Namely, the DC converter of this embodiment can stably drive the synchronous rectifiers and improve the efficiency thereof.

Figure 1:
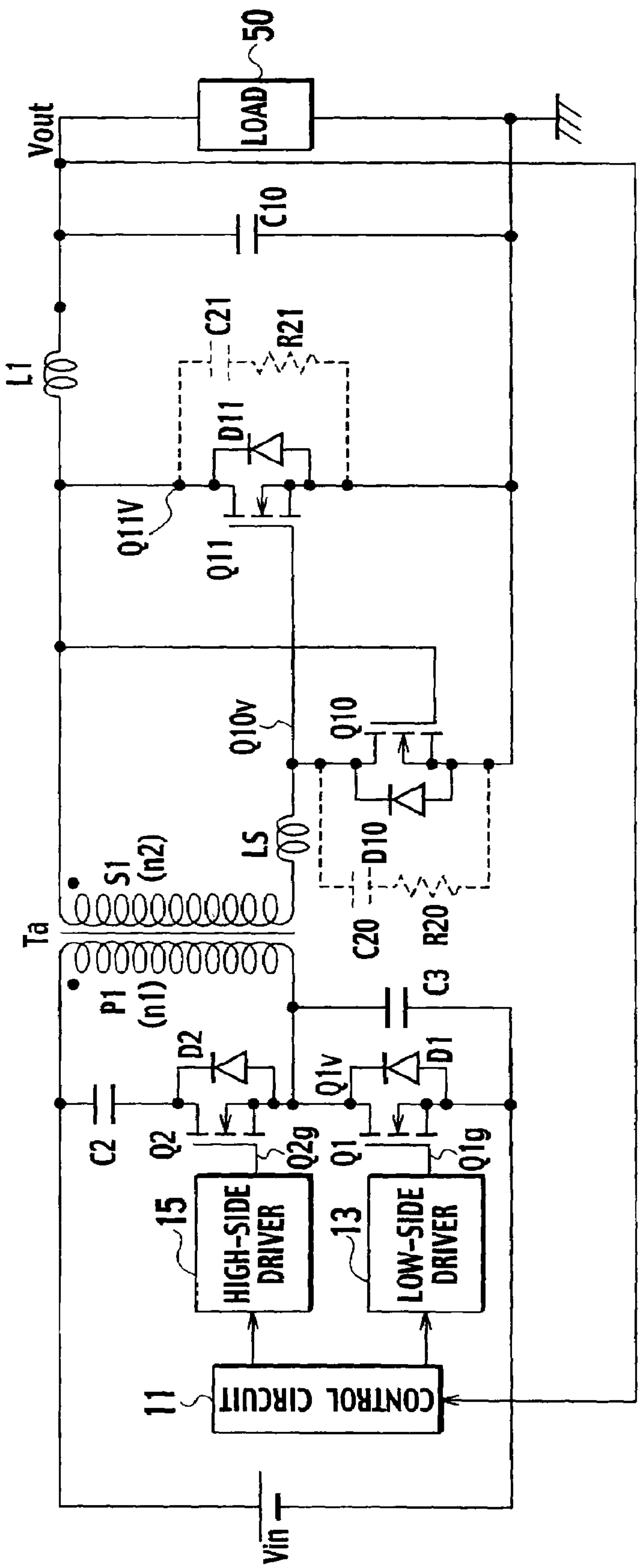
FIG. 1 is a circuit diagram showing a DC converter according to a first related art.

Compared with the DC converter of FIG. 1, the DC converter of FIG. 8 has no CR snubber circuits (the resistors R20 and R21 and capacitors C20 and C21).

Figure 2:
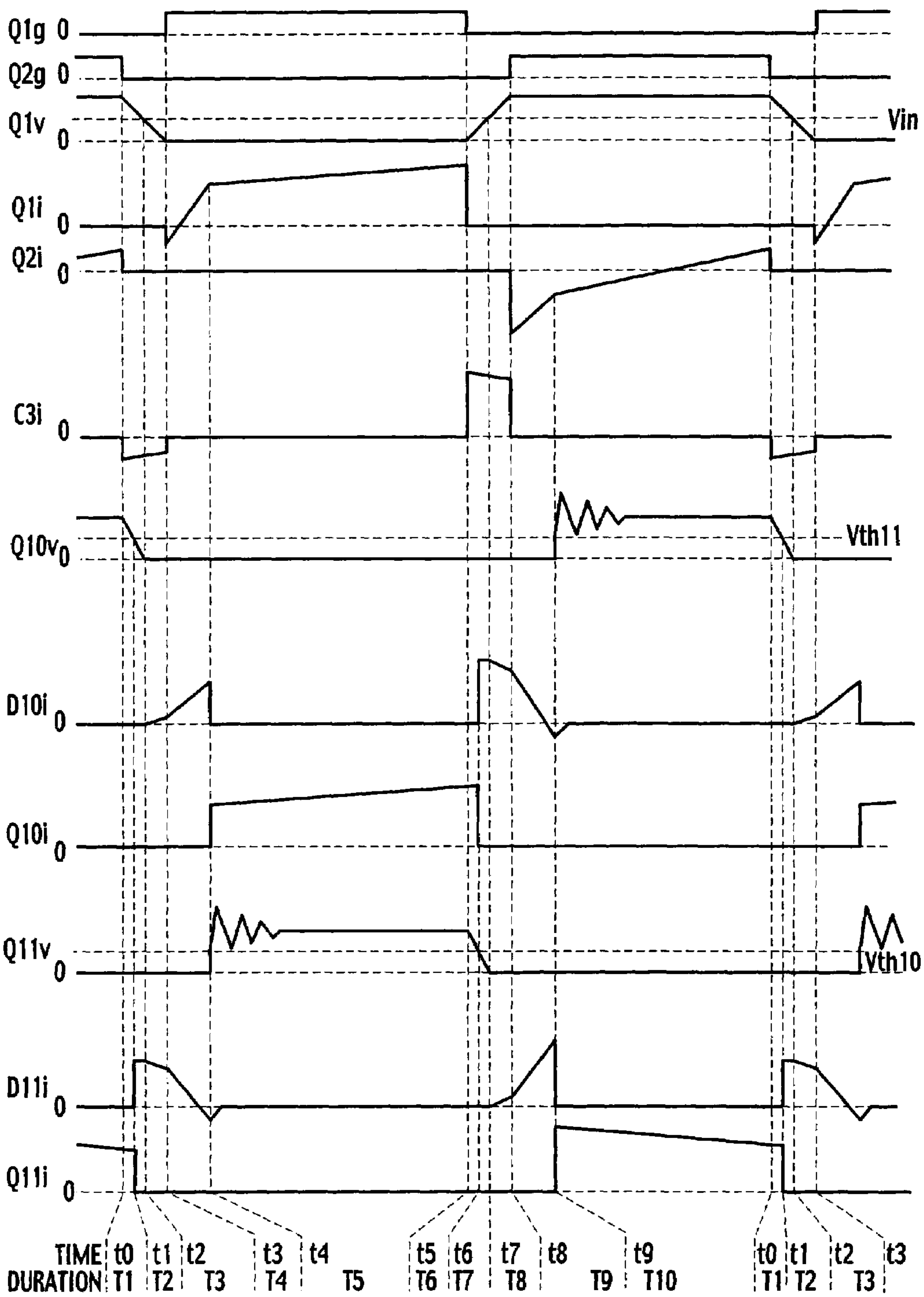
FIG. 2 is a timing chart showing signals at various parts of the DC converter according to the first related art.
Figure 9:
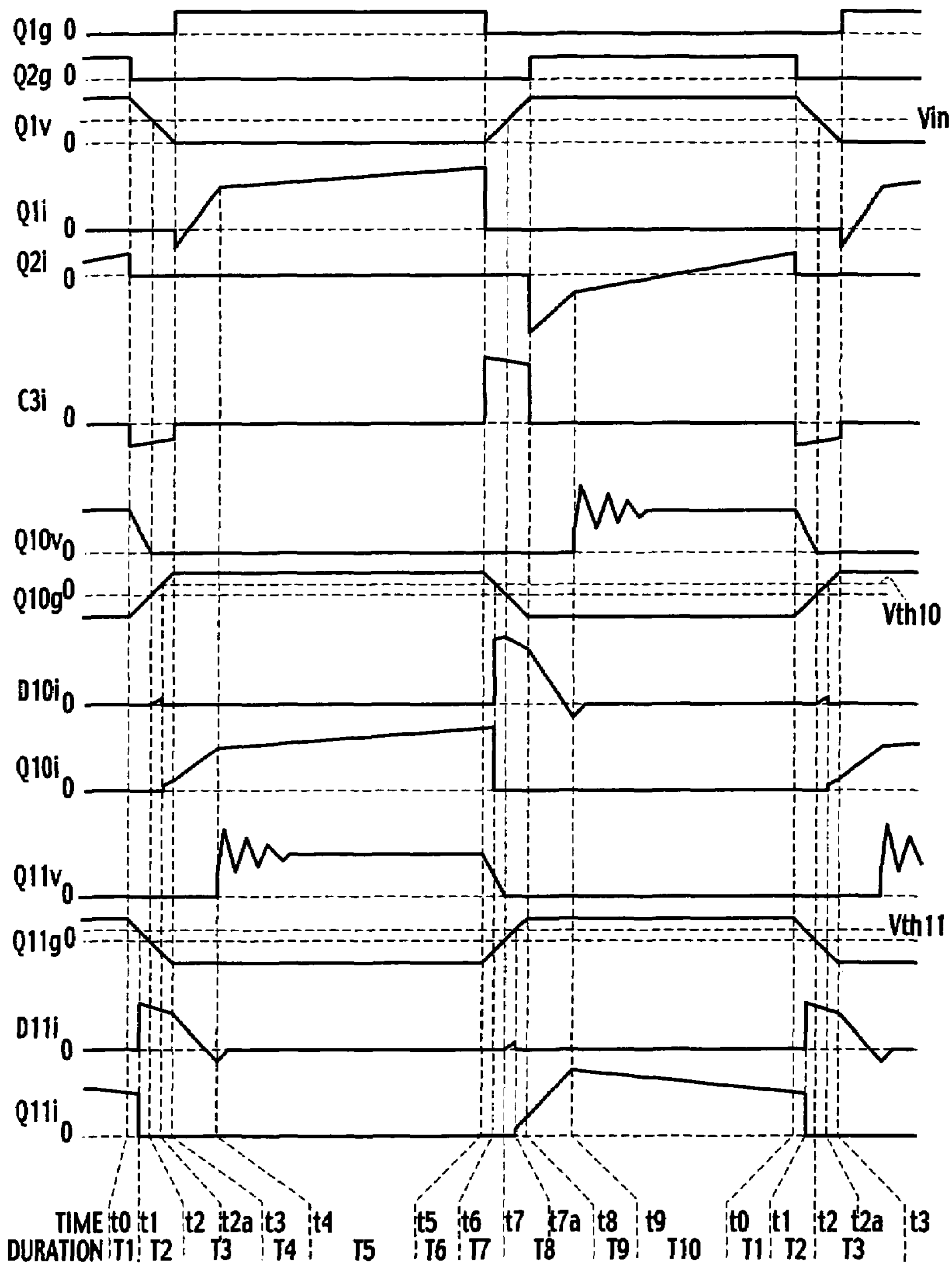
FIG. 9 is a timing chart showing signals at various parts of the DC converter according to the first embodiment.

Operation of the DC converter according to the first embodiment will be explained with reference to a timing chart of FIG. 9. In addition to the signals shown in FIG. 2, FIG. 9 includes a gate signal (drive signal) Q10*g* for driving the gate of the switch Q10 and a gate signal (drive signal) Q11*g* for driving the gate of the switch Q11.

Before t0, the switch Q1 is OFF and the switch Q2 is ON. On the primary side of the transformer Tc, a current passes through a path along Q2, P1, C2, and Q2. The primary winding P1 of the transformer Tc receives a voltage VC2 from the clamp capacitor C2, and the potential of the winding end of the primary winding P1 is positive. Accordingly, the potential of the winding end of the tertiary winding S3 is positive and the potential of the gate voltage Q11*g* of the switch Q11 is positive to turn on the switch Q11.

On the secondary side of the transformer Tc, a current passes through a path along L1, C10, Q11, and L1. The voltage Q11*v* of the switch Q11 is substantially zero and the switch Q10 is OFF.

At t0 of period T1, the switch Q2 changes from ON to OFF and the current passing through the path along Q2, P1, C2, and Q2 becomes zero. Instead, a current passes through a path along P1, Vin, C3, and P1, to discharge the capacitor C3 and drop the voltage Q1*v* of the switch Q1. When the voltage Q1*v* drops, the terminal voltage of the primary winding P1 decreases to decrease the terminal voltage of the tertiary winding S3. This results in decreasing the gate voltage Q11*g* of the switch Q11 and increasing the gate voltage Q10*g* of the switch Q10. At the same time, the terminal voltage of the secondary winding S1 decreases to decrease the voltage Q10*v* of the switch Q10.

At t1 of period T2, the gate voltage Q11*g* of the switch Q11 decreases to a gate threshold voltage Vth11 of the switch Q11. The switch Q11 turns off, the current Q11*i* of the switch Q11 becomes zero, and the current passing through the switch Q11 changes its direction to the diode D11.

At t2 of period T3, the voltage Q1*v* of the switch Q1 reaches Vin. The terminal voltage of the primary winding P1 becomes zero, the terminal voltage of the tertiary winding S3 becomes zero, and the gate voltages Q10*g* and Q11*g* of the switches Q10 and Q11 become zero. The terminal voltage of the secondary winding S1 also becomes zero to zero the voltage Q10*v* of the switch Q10.

The voltage Q1*v* of the switch Q1 further decreases to apply positive potential to the winding start of the primary winding P1, and also, positive potential to the winding start of the secondary winding S1. At t3, the voltage Q1*v* of the switch Q1 becomes zero. Then, the terminal voltage of the primary winding P1 becomes Vin and the terminal voltage of the secondary winding S1 becomes level of Vin·(n2/n1). In the period T3, the terminal voltage of the primary winding P1 changes from zero to Vin with the winding start of the primary winding P1 being positive. At this time, the terminal voltage of the secondary winding S1 changes from zero to level of Vin·(n2/n1) with the winding start of the secondary winding S1 being positive.

Accordingly, a current ILS(t) passing through the leakage inductance LS increases according to following expression:

$$ILS(t)=(VS1(t)/LS)\cdot t \quad (9),$$

where VS1(t) is the terminal voltage of the secondary winding S1. The current passing through the leakage inductance LS is equal to the current of the diode D10, and therefore, a current D10*i* of the diode D10 increases in the period T3. By an increment of the current D10*i* of the diode D10, a current D11*i* of the diode D11 decreases. At t2*a*, the gate voltage Q10*g* of the switch Q10 reaches a gate threshold voltage Vth10 to turn on the switch Q10, and the current passing through the diode D10 changes to the switch Q10.

During the period T3 on the secondary side of the transformer Tc, a current passes through a path along L1, C10, D11, and L1 and another current passes through a path along L1, C10, D10 (Q10), LS, S1, and L1. The latter current increases according to the expression (9), and the former current decreases thereby.

At t3 of period T4, the capacitor C3 completely discharges, the voltage Q1*v* of the switch Q1 becomes zero, the current passing through the path along P1, Vin, C3, and P1 changes its direction to a route of P1, Vin, D1 (Q1), and P1, and the switch Q1 turns on in response to the gate signal Q1*g*.

In the period T4, the voltage Q1*v* of the switch Q1 is substantially zero and the terminal voltage of the primary winding P1 is Vin. The terminal voltage VS1(t) of the secondary winding S1, therefore, is level of Vin·(n2/n1). The current ILS(t) passing through the leakage inductance LS increases according to following expression:

$$\begin{aligned} ILS(t) &= (VS1(t)/LS)\cdot t + ILS(t3) \\ &= (Vin\cdot(n2/n1)/LS)\cdot t + ILS(t3), \end{aligned} \tag{10}$$

where ILS(t3) is a current passing through the leakage inductance LS at t3. By an increment of the current passing through the leakage inductance LS, the current D11*i* of the diode D11 decreases and reaches at t4 a current passing through the smoothing reactor L1. Then, the current ILS(t) becomes equal to the current of the smoothing reactor L1, the current D11*i* of the diode D11 becomes zero, and the diode D11 passes a reverse current due to a recovery current of the diode D11.

The current Q1*i* of the switch Q1 is proportional to a current passing through the secondary winding S1 at the ratio of the numbers of turns. The current Q1*i* of the switch Q1, therefore, increases and reaches at t4 the current passing through the smoothing reactor L1 times the ratio of the numbers of turns.

At t4 of period T5, the recovery current of the diode D11 decreases, and the voltage Q11*v* of the switch Q11 increases. The voltage Q11*v* of the switch Q11 oscillates due to the junction capacitance existing at the leakage inductance LS and diode D11 and the output capacitance existing at the switch Q11. The oscillation gradually attenuates, and the voltage Q11*v* of the switch Q11 settles to level of Vin·(n2/n1).

Figure 6:
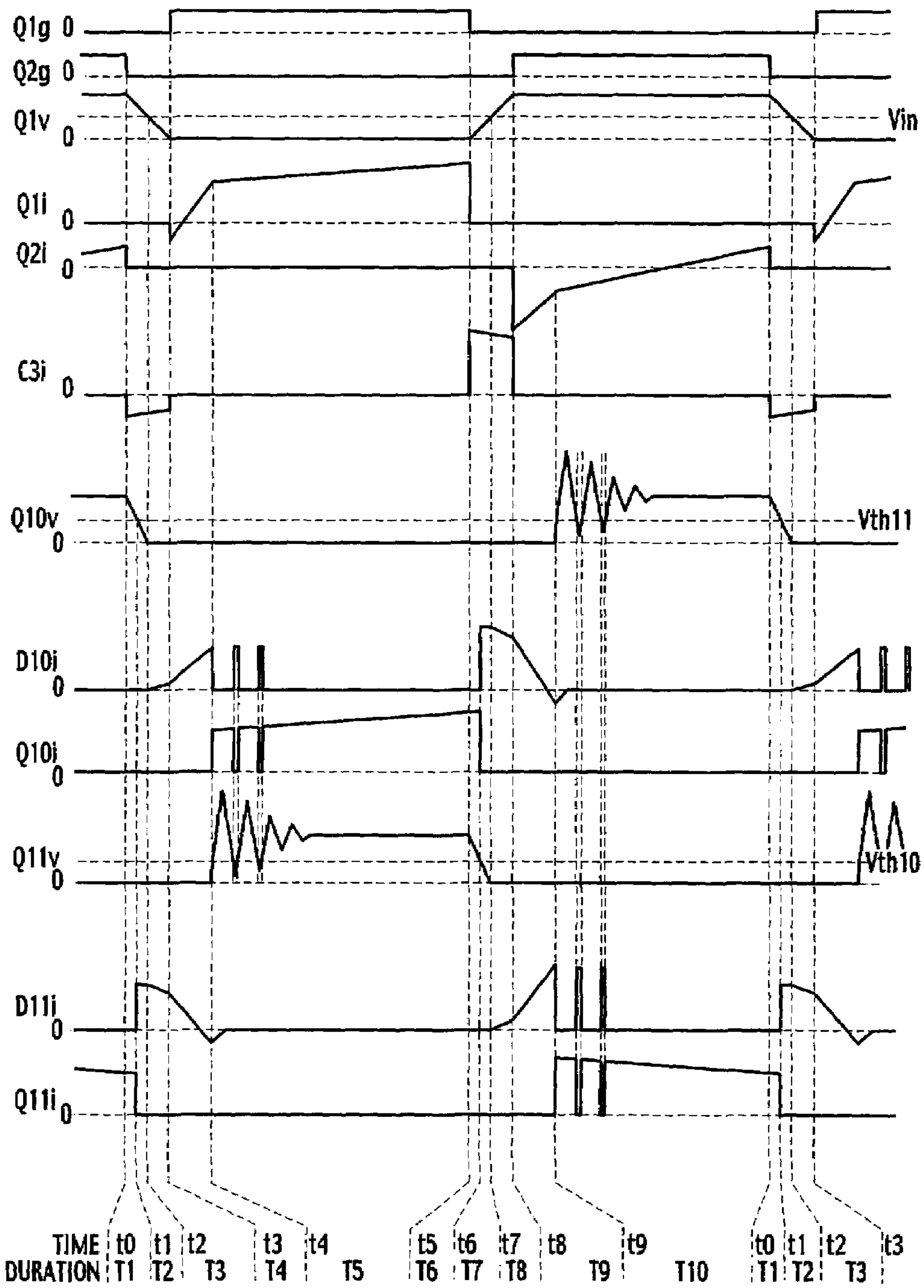
FIG. 6 is a timing chart showing signals at various parts of the DC converter according to the second related art.
Figure 7:
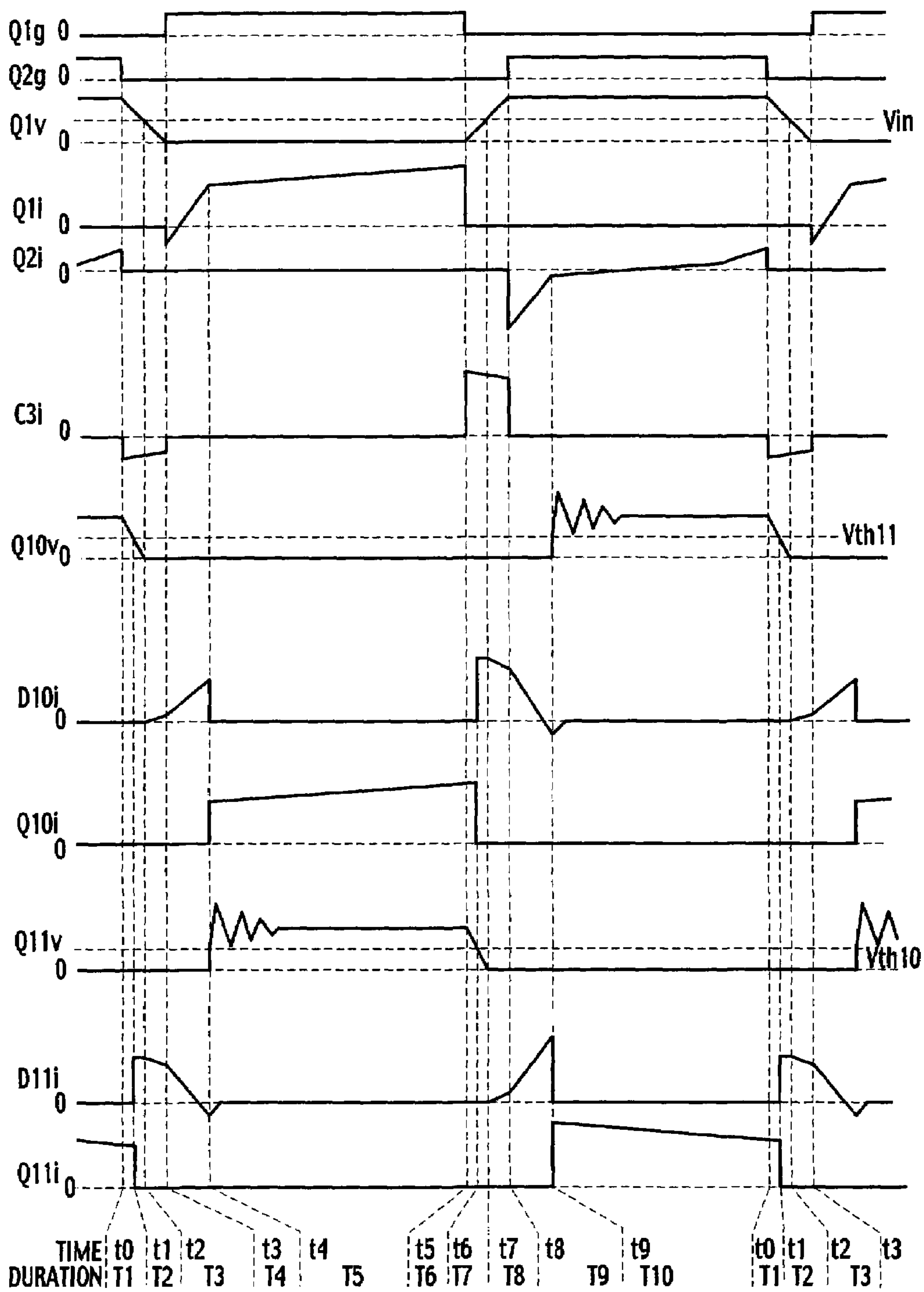
FIG. 7 is a timing chart showing signals at various parts of the DC converter according to the second related art.

Even if the oscillation becomes larger, the tertiary winding S3 that drives the switches Q10 and Q11, i.e., the synchronous rectifiers and is tightly coupled with the primary winding P1 is never affected thereby. Accordingly, the switch Q10 is not repeatedly turned on and off to cause the chattering observed in the operational waveforms of the related art shown in FIG. 6.

At t5 of period T6, the gate signal Q1*g* of the switch Q1 falls to zero the current Q1*i* of the switch Q1. The current passing through the path along Vin, P1, Q1, and Vin starts to change to the path along Vin, P1, C3, and Vin. As a result, the voltage of the capacitor C3 increases, the voltage Q1*v* of the switch Q1 increases, the voltage Q11*v* of the switch Q11 decreases, the gate voltage Q10*g* of the switch Q10 decreases, and the gate voltage Q11*g* of the switch Q11 increases.

At t6 of period T7, the gate voltage Q10*g* decreases to the gate threshold voltage Vth10 of the switch Q10 to turn off the switch Q10. The current Q10*i* of the switch Q10 becomes zero and the current passing through the switch Q10 changes its direction to the diode D10.

At t7 of period T8, the voltage Q1*v* of the switch Q1 reaches Vin. The terminal voltage of the primary winding P1 becomes zero and the terminal voltage of the tertiary winding S3 becomes zero to zero the gate voltages Q10*g* and Q11*g* of the switches Q10 and Q11. At the same time, the terminal voltage of the secondary winding S1 becomes zero to zero the voltage Q11*v* of the switch Q11. The voltage Q1*v* of the switch Q1 further increases to apply positive potential to the winding end of the primary winding P1. The winding end of the tertiary winding S3 also receives positive potential. At t8, the voltage Q1*v* of the switch Q1 reaches level of Vin+VC2. As a result, the terminal voltage of the primary winding P1 becomes VC2 and that of the secondary winding S1 becomes level of VC2·(n2/n1).

In the period T8, the terminal voltage of the primary winding P1 with its winding end receiving positive potential changes from zero to VC2. At this time, the terminal potential of the secondary winding S1 with its winding end receiving positive potential changes from zero to level of VC2·(n2/n1). Accordingly, the current ILS(t) passing through the leakage inductance LS decreases according to following expression:

$$ILS(t)=ILS(t7)-(VS1(t)/LS)\cdot t \tag{11}$$

where VS1(t) is the terminal voltage of the secondary winding S1 and ILS(t7) is a current passing through the leakage inductance LS at t7. The current passing through the leakage inductance LS is equal to the current passing through the diode D10, and therefore, the current D10*i* of the diode D10 decreases in the period T8. By a decrement in the current D10*i* of the diode D10, the current D11*i* of the diode D11 increases. At t7*a*, the gate voltage Q11*g* of the switch Q11 reaches the gate threshold voltage Vth11 to turn on the switch Q11, and the current passing through the diode D11 changes its direction to the switch Q11. In the period T8 on the secondary side of the transformer Tc, a current passes through a path along L1, C10, D10, LS, S1, and L1 and another current passes through a path along L1, C10, D11 (Q11), and L1. The former current decreases according to the expression (11), and the latter current increases by the decrement of the former current.

At t8 of period T9, the capacitor C3 is completely charged, the voltage Q1*v* of the switch Q1 is substantially level of Vin+VC2, and the terminal voltage of the primary winding P1 is VC2. Accordingly, the terminal voltage VS1(t) of the secondary winding S1 is level of VC2·(n2/n1) and the current ILS(t) passing through the leakage inductance LS decreases according to following expression:

$$\begin{aligned} ILS(t) &= ILS(t8) - (VS1(t)/LS)\cdot t \\ &= ILS(t8) - (VC2\cdot(n2/n1)/LS)\cdot t, \end{aligned} \tag{12}$$

where ILS(t8) is a current passing through the leakage inductance LS at t8. In this way, the current passing through the leakage inductance LS decreases, and by this decrement, the current Q11*i* of the switch Q11 increases. At t9, the current passing through the leakage inductance LS becomes zero, and the current Q11*i* of the switch Q11 becomes equal to a current passing through the smoothing reactor L1.

The current Q2*i* of the switch Q2 is proportional to a current passing through the secondary winding S1 at the ratio of the numbers of turns. Namely, the current Q2*i* of the switch Q2 increases and becomes an excitation current of the primary winding P1 at t9.

At t9 of period T10, the recovery current of the diode D10 decreases and the voltage Q10*v* of the switch Q10 increases. The voltage Q10*v* oscillates due to the junction capacitance existing at the leakage inductance LS and diode D10 and the output capacitance existing at the switch Q10. The oscillation gradually attenuates and the voltage Q10*v* becomes level of VC2·(n2/n1). Even if the oscillation becomes larger, the tertiary winding S3 that drives the switches Q10 and Q11, i.e., the synchronous rectifiers and is tightly coupled with the primary winding P1 is never affected thereby. Accordingly, the switch Q11 is never repeatedly turned on and off to cause the chattering observed in the operational waveforms of the related art shown in FIG. 6.

In this way, the first embodiment employs the voltage of the tertiary winding S3 tightly coupled with the primary winding P1, to drive the switches Q10 and Q11 serving as synchronous rectifiers, thereby advancing the ON timing of the switch Q10 from t4 to t2*a* so that a current is passed through the synchronous rectifier Q10 in the period T4.

In addition, the first embodiment brings forward the ON timing of the switch Q11 from t9 to t7*a* so that a current is passed through the switch Q11 in the period T9. In this way, the first embodiment extends a current passing period of each synchronous rectifier, thereby improving the efficiency of the DC converter.

According to the first embodiment, the switches Q10 and Q11, i.e., the synchronous rectifiers are never repeatedly turned on and off to cause chattering due to oscillation caused by recovery currents of the rectifying diodes D10 and D11 connected in parallel with the switches Q10 and Q11. Namely, the first embodiment can stably drive the synchronous rectifiers and improve the efficiency of the DC converter.

SECOND EMBODIMENT

Figure 10:
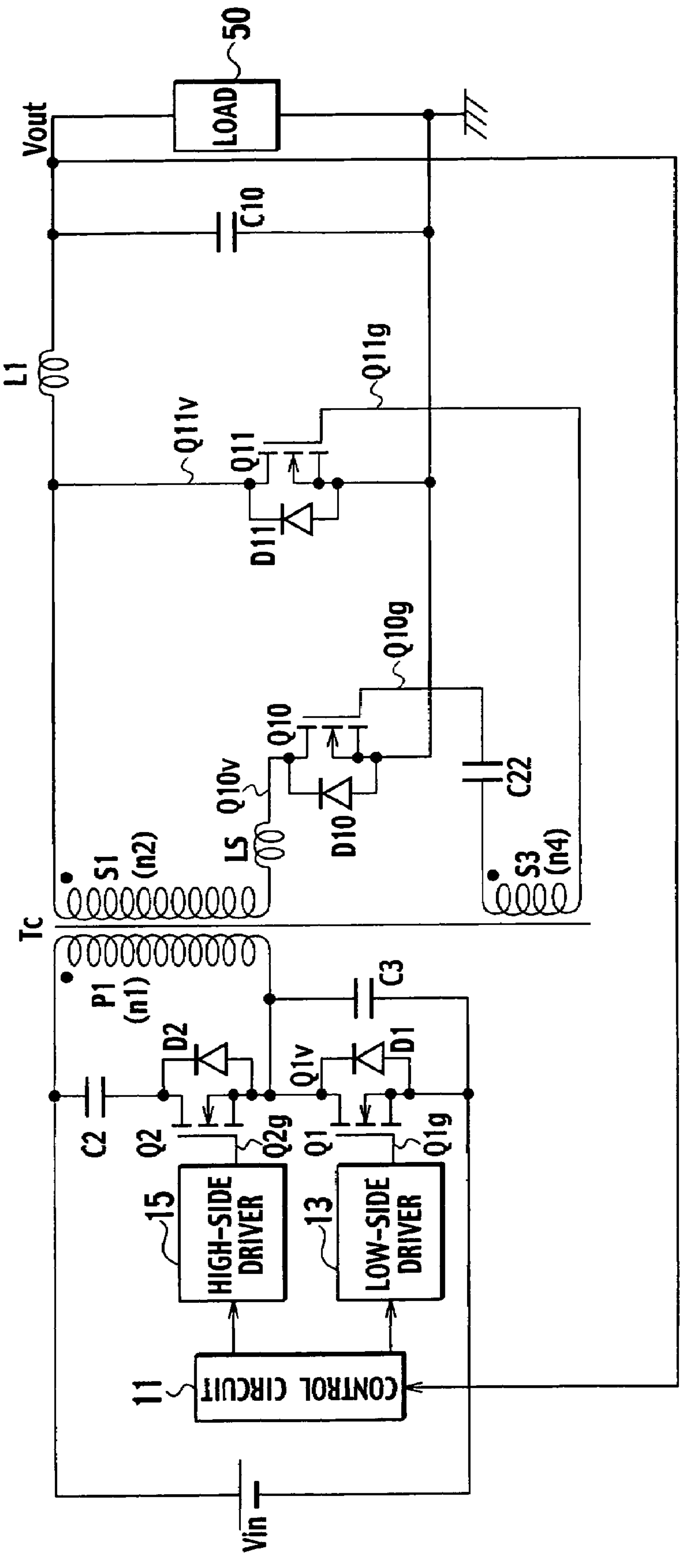
FIG. 10 is a circuit diagram showing a DC converter according to a second embodiment of the present invention.

FIG. 10 is a circuit diagram showing a DC converter according to the second embodiment of the present invention. In addition to the structure of the first embodiment shown in FIG. 8, the second embodiment employs a capacitor C22, i.e., a first capacitor between the winding start of a tertiary winding S3 and the gate of a switch Q10.

The capacitor C22 may be arranged between the winding end of the tertiary winding S3 and the gate of a switch Q11.

The DC converter according to the second embodiment provides the same effects as those of the DC converter of the first embodiment. In addition, the capacitance of the additional capacitor C22 is connected in series with the input capacitance (not shown) of switches Q10 and Q11 that are MOSFETs serving as synchronous rectifiers. Even if the tertiary winding S3 generates a voltage higher than the withstanding voltage of the drive terminal (gate) of each synchronous rectifier, a drive terminal voltage of the synchronous rectifier can be adjusted to be below the withstanding voltage of the drive terminal of the synchronous rectifier. Consequently, the synchronous rectifiers will never be broken.

Operation of the DC converter according to the second embodiment differs from that of the DC converter of FIG. 8 in that the capacitor C22 and the input capacitance of the synchronous rectifiers properly adjust a voltage applied to the drive terminal of each synchronous rectifier when driving the synchronous rectifiers. Except for this, operation of the second embodiment is basically the same as that explained with reference to the timing chart of FIG. 9. Accordingly, the detailed explanation of the second embodiment is omitted.

A second capacitor (not shown) may be added in parallel with the input capacitance (not shown) of each of the switches Q10 and Q11 that are MOSFETs serving as synchronous rectifiers. In this case, the input capacitance of the switches Q10 and Q11, the second capacitors, and the first capacitor connected in series with the tertiary winding S3 may properly adjust a drive voltage applied to each synchronous rectifier.

THIRD EMBODIMENT

Figure 11:
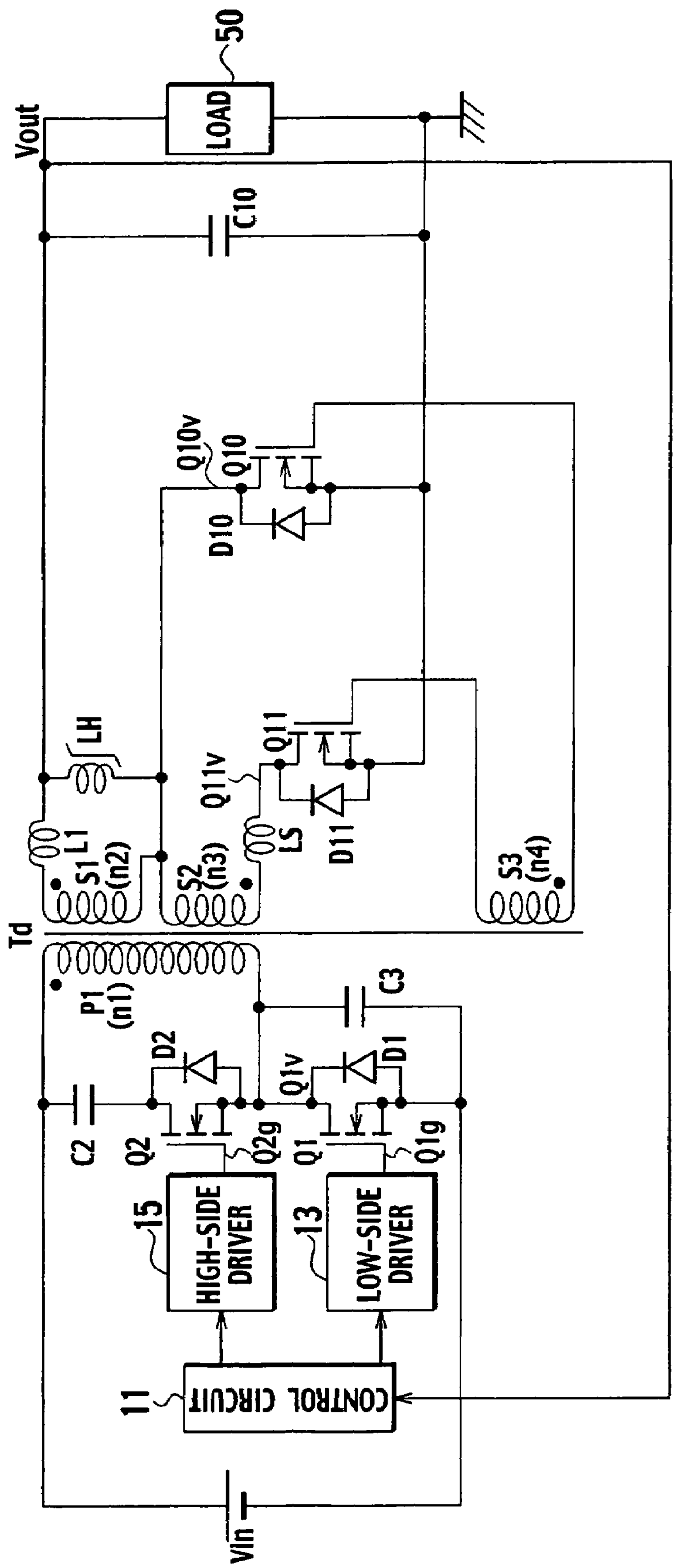
FIG. 11 is a circuit diagram showing a DC converter according to a third embodiment of the present invention.

FIG. 11 is a circuit diagram showing a DC converter according to the third embodiment of the present invention. Parts of the third embodiment that are different from those of the related art of FIG. 3 will be explained.

A transformer Td of the third embodiment has a primary winding (having the number of turns of n1), a first secondary winding S1 (having the number of turns of n2) very loosely coupled with the primary winding P1, a second secondary winding S2 (having the number of turns of n3) loosely coupled with the primary winding P1, and a tertiary winding S3 (having the number of turns of n4) tightly coupled with the primary winding P1.

To turn on a switch Q10 when a switch Q1 is ON, the winding start of the tertiary winding S3 is connected to the gate of the switch Q10. To turn on a switch Q11 when the switch Q1 is OFF, the winding end of the tertiary winding S3 is connected to the gate of the switch Q11.

A voltage generated by the tertiary winding S3 is applied to the gates of the switches Q10 and Q11, to drive the switches Q10 and Q11. The tertiary winding S3 is tightly coupled with the primary winding P1, and therefore, has the same voltage waveform as that of the primary winding P1.

The third embodiment can extend the ON period of each of the switches Q10 and Q11 serving as synchronous rectifiers and improve the efficiency of synchronous rectification. The third embodiment employs the tertiary winding S3 tightly coupled with the primary winding P1, to drive the synchronous rectifiers so that the synchronous rectifiers are never repeatedly turned on and off to cause chattering due to oscillation caused by recovery currents of rectifying diodes D10 and D11 connected in parallel with the synchronous rectifiers. As a result, the third embodiment can stably drive the synchronous rectifiers and improve the efficiency of the DC converter.

Figure 3:
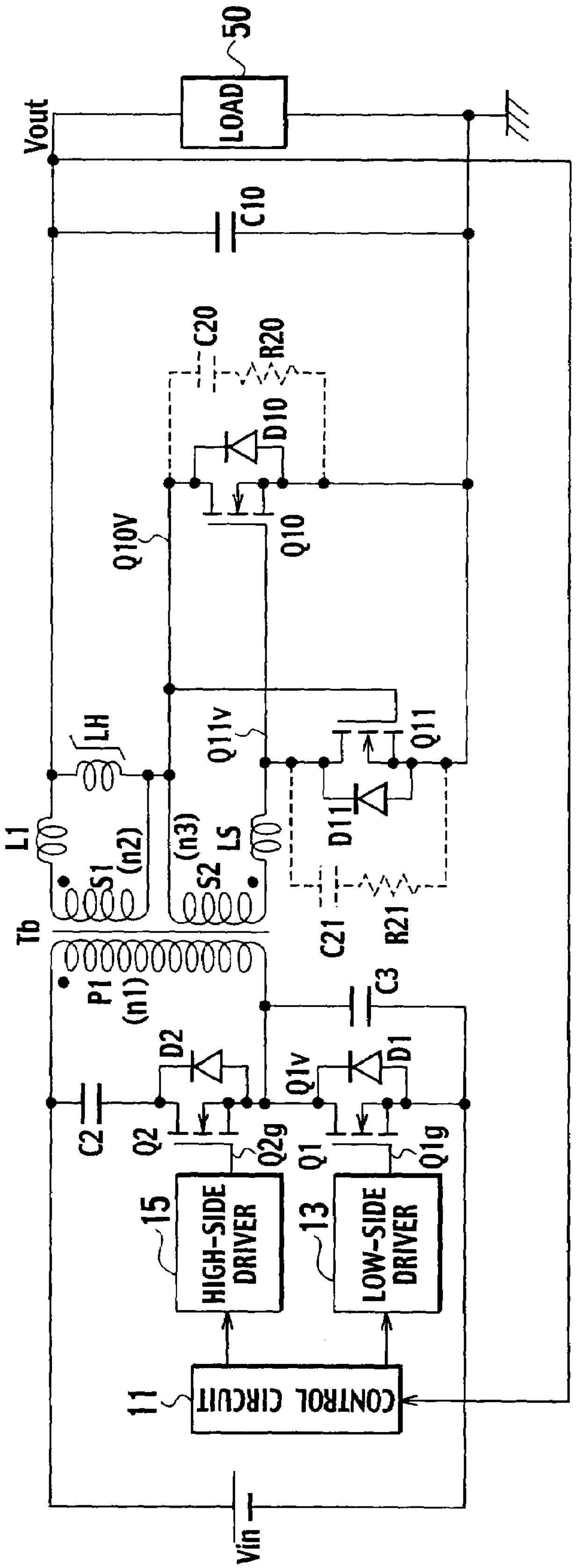
FIG. 3 is a circuit diagram showing a DC converter according to a second related art.
Figure 4:
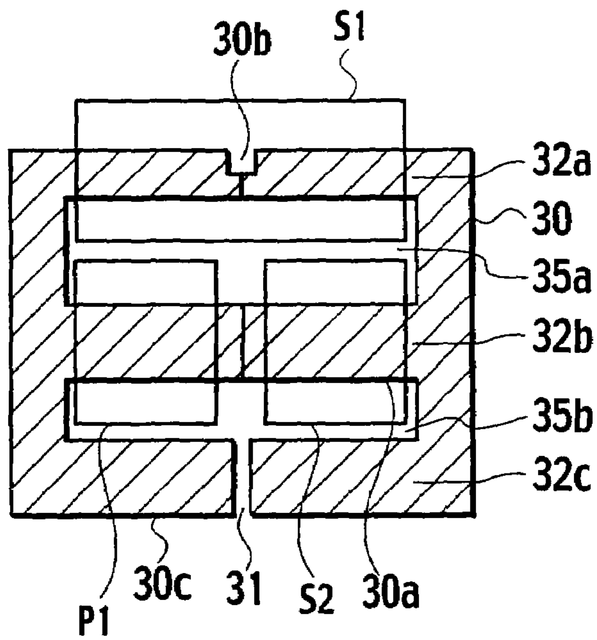
FIG. 4 is a view showing the structure of a transformer installed in the DC converter according to the second related art.
Figure 5:
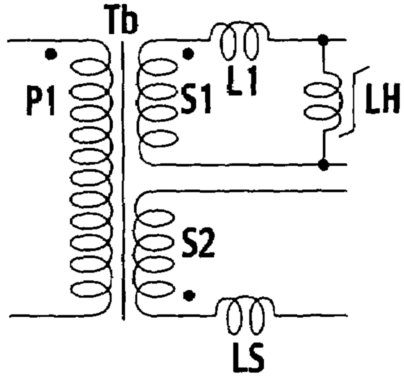
FIG. 5 is an equivalent circuit diagram showing the transformer of FIG. 4.

Compared with the DC converter of FIG. 3, the DC converter of FIG. 11 has no CR snubber circuits (the resistors R20 and R21 and capacitors C20 and C21).

Figure 12:
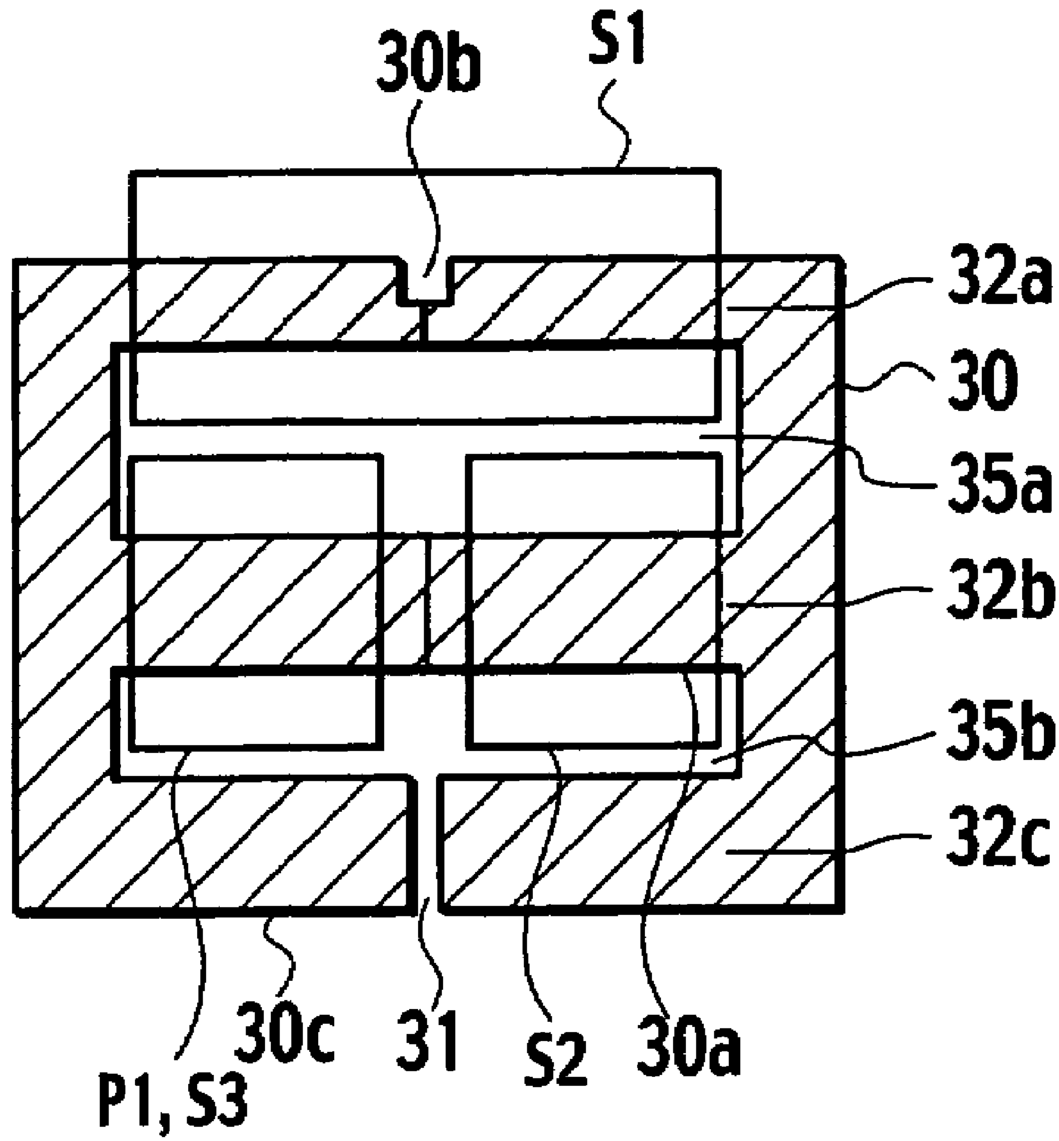
FIG. 12 is a view showing the structure of a transformer installed in the DC converter of the third embodiment.

FIG. 12 is a view showing the structure of the transformer Td installed in the DC converter according to the third embodiment. The transformer Td has a core 30 having a rectangular external shape. The core 30 has spaces 35*a* and 35*b* extending in parallel to each other in a longitudinal magnetic path direction, to form magnetic paths 32*a*, 32*b*, and 32*c*. Around a core part 30*a* of the core 30, the primary winding P1, tertiary winding S3, and second secondary winding S2 are wound adjacent to each other. This produces a slight leakage inductance (LS of FIG. 11) between the primary winding P1 plus the tertiary winding S3 and the second secondary winding S2. The core 30 has a path core 30*c* and a gap 31. Around a peripheral core, the first secondary winding S1 is wound. The path core 30*c* works to very loosely couple the primary winding P1 and first secondary winding S1 with each other, thereby increasing a leakage inductance (L1 of FIG. 11).

On the peripheral core and between the primary winding P1 and the second secondary winding S2, a recess 30*b* is formed. The recess 30*b* reduces the sectional area of a part of a magnetic path of the core so that only the part may saturate. This configuration can reduce a core loss of power. The part that saturates is used as a saturable reactor (LH of FIG. 11). Forming the recess 30*b* at a part of the core 30 where the first secondary winding S1 is wound results in saturating the part, increasing an excitation current, and producing a voltage resonance.

Figure 13:
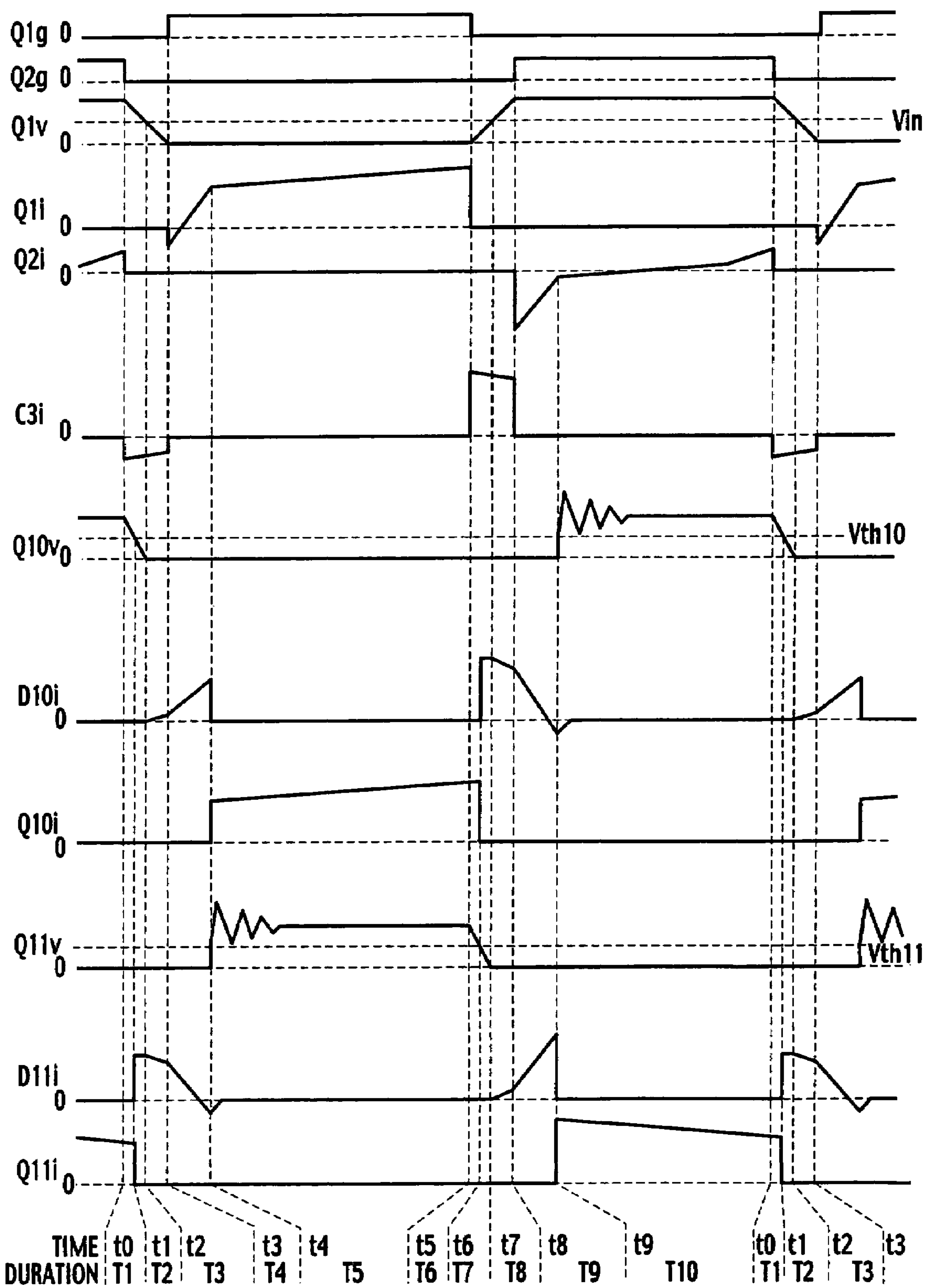
FIG. 13 is a timing chart showing signals at various parts of the DC converter of the third embodiment.

FIG. 13 is a timing chart showing signals at various parts of the DC converter according to the third embodiment. Basic operation of the third embodiment is substantially the same as that of the related art shown in FIG. 3, and operation of the tertiary winding S3 is substantially the same as that of the DC converter of FIG. 8. Accordingly, the detailed explanation of the operation of the third embodiment is omitted.

The DC converter of the third embodiment provides effects similar to those of the DC converter of the first embodiment.

The DC converter of the third embodiment may have a first capacitor (C22) between the winding start of the tertiary winding S3 and the gate of the switch Q10. Instead, the capacitor C22 may be arranged between the winding end of the tertiary winding S3 and the gate of the switch Q11. This configuration provides the effects of both the embodiments 2 and 3.

A second capacitor (not shown) may be added in parallel with the input capacitance (not shown) of each of the switches Q10 and Q11 that are MOSFETs serving as synchronous rectifiers. In this case, the input capacitance of each of the switches Q10 and Q11, the second capacitors, and the first capacitor connected in series with the tertiary winding S3 may properly adjust a drive voltage applied to each synchronous rectifier.

In summary, a DC converter according to the present invention employs a voltage generated by a tertiary winding of a transformer, to drive synchronous rectifiers. The present invention can extend the ON period of each synchronous rectifier and improve the efficiency of synchronous rectification.

By driving the synchronous rectifiers with the tertiary winding, the DC converter of the present invention prevents the synchronous rectifiers from repeatedly turning on and off to cause chattering due to oscillation caused by a recovery current of a rectifying diode that is connected in parallel with each synchronous rectifier. Due to this, the DC converter of the present invention can operate stably and improve efficiency.

The present invention is applicable to switching power sources such as DC-DC converters and AC-DC converters.

This application claims benefit of priority under 35USC §119 to Japanese Patent Applications No. 2005-051710, filed on Feb. 25, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC converter, comprising:

a transformer including primary and secondary windings that are loosely coupled with each other, and a tertiary winding tightly coupled with the primary winding;

a main switch connected in series with the primary winding; and a series circuit connected to ends of one of the primary winding and the main switch, and including a clamp capacitor and an auxiliary switch, the main and auxiliary switches being alternately turned on/off so that a voltage of the secondary winding of the transformer is synchronously rectified with synchronous rectifiers and is smoothed with smoothing elements to provide a DC output, wherein the tertiary winding is configured to generate a voltage that drives the synchronous rectifiers, a winding start of the tertiary winding is connected to a first one of the synchronous rectifiers, and a winding end of the tertiary winding is connected to a second one of the synchronous rectifiers, and the tertiary winding is not connected to ground.

2. The DC converter of claim 1, further comprising:

a first capacitor connected in series with the tertiary winding of the transformer, and configured to drive the synchronous rectifiers through the first capacitor.

3. The DC converter of claim 2, further comprising:

a second capacitor connected in parallel with a drive terminal of each of the synchronous rectifiers.

4. The DC converter of claim 1, wherein the winding start of the tertiary winding is only connected to the first one of the synchronous rectifiers, and winding end of the tertiary winding is only connected to the second one of the synchronous rectifiers.

5. A DC converter, comprising:

a transformer including a primary winding, a first secondary winding very loosely coupled with the primary winding, a second secondary winding loosely coupled with the primary winding, and a tertiary winding tightly coupled with the primary winding;

a main switch connected in senes with the primary winding; and a series circuit connected to ends of one of the primary winding and a main switch, and including a clamp capacitor and an auxiliary switch, the main and auxiliary switches being alternately turned on/off so that energy is accumulated in a leakage inductance between the primary winding and the first secondary winding as the main switch is ON, the accumulated energy is transferred through the second secondary winding to a secondary side of the transformer as the main switch is OFF, and a voltage of the secondary windings is synchronously rectified with synchronous rectifiers and smoothed with smoothing elements to provide a DC output, wherein the tertiary winding is configured to generate a voltage that drives the synchronous rectifiers, a winding start of the tertiary winding is connected to a first one of the synchronous rectifiers, and a winding end of the tertiary winding is connected to a second one of the synchronous rectifiers, and the tertiary winding is not connected to ground.

6. The DC converter of claim 5, further comprising: a first capacitor connected in series with the tertiary winding of the transformer, and configured to drive the synchronous rectifiers through the first capacitor.

7. The DC converter of claim 6, further comprising:

a second capacitor connected in parallel with a drive terminal of each of the synchronous rectifiers.

8. The DC converter of claim 5, wherein the winding start of the tertiary winding is only connected to the first one of the synchronous rectifiers, and the winding end of the tertiary winding is only connected to the second one of the synchronous rectifiers.

* * * * *